US008326629B2

(12) United States Patent
Skuratovsky

(10) Patent No.: US 8,326,629 B2
(45) Date of Patent: Dec. 4, 2012

(54) DYNAMICALLY CHANGING VOICE ATTRIBUTES DURING SPEECH SYNTHESIS BASED UPON PARAMETER DIFFERENTIATION FOR DIALOG CONTEXTS

(75) Inventor: Ilya Skuratovsky, Stamford, CT (US)

(73) Assignee: Nuance Communications, Inc., Burlington, MA (US)

( * ) Notice: Subject to any disclaimer, the term of this patent is extended or adjusted under 35 U.S.C. 154(b) by 1601 days.

(21) Appl. No.: 11/164,415

(22) Filed: Nov. 22, 2005

(65) Prior Publication Data

US 2007/0118378 A1 May 24, 2007

(51) Int. Cl.
*G10L 13/08* (2006.01)
*G10L 13/00* (2006.01)
*G06F 17/27* (2006.01)

(52) U.S. Cl. ............................. 704/260; 704/258; 704/9

(58) Field of Classification Search .................. 704/260, 704/E13.013, E13.011, 1, 9, 258
See application file for complete search history.

(56) References Cited

U.S. PATENT DOCUMENTS

| | | | | |
|---|---|---|---|---|
| 5,860,064 | A * | 1/1999 | Henton | 704/260 |
| 6,446,040 | B1 * | 9/2002 | Socher et al. | 704/260 |
| 6,466,653 | B1 | 10/2002 | Hamrick et al. | |
| 6,792,407 | B2 | 9/2004 | Kibre et al. | |
| 7,085,709 | B2 * | 8/2006 | Panttaja | 704/9 |
| 7,103,548 | B2 * | 9/2006 | Squibbs et al. | 704/260 |
| 7,283,841 | B2 * | 10/2007 | Luke et al. | 455/556.1 |
| 2002/0013708 | A1 | 1/2002 | Walker et al. | |
| 2003/0023442 | A1 | 1/2003 | Akabane et al. | |
| 2003/0028380 | A1 * | 2/2003 | Freeland et al. | 704/260 |
| 2004/0054534 | A1 | 3/2004 | Junqua | |
| 2004/0059577 | A1 * | 3/2004 | Pickering | 704/260 |
| 2004/0111271 | A1 * | 6/2004 | Tischer | 704/277 |
| 2005/0171780 | A1 * | 8/2005 | Schmid et al. | 704/270.1 |

OTHER PUBLICATIONS

Zhang et al. "Identifying Speakers in Children's Stories for Speech Synthesis". Eurospeech 2003.*
Ge et al. "A Statistical Approach to Anaphora Resolution". In Charniak, Eugene, editor, Proceedings of the Sixth Workshop on Very Large Corpora, pp. 161-170, Montreal, Canada, 1998.*

* cited by examiner

*Primary Examiner* — Jesse Pullias
(74) *Attorney, Agent, or Firm* — Wolf, Greenfield & Sacks, P.C.

(57) ABSTRACT

A method of speech synthesis can include automatically identifying spoken passages and non-spoken passages within a text source and converting the text source to speech by applying different voice configurations to different portions of text within the text source according to whether each portion of text was identified as a spoken passage or a non-spoken passage. The method further can include identifying the speaker and/or the gender of the speaker and applying different voice configurations according to the speaker identity and/or speaker gender.

18 Claims, 2 Drawing Sheets

DYNAMICALLY CHANGING VOICE ATTRIBUTES DURING SPEECH SYNTHESIS BASED UPON PARAMETER DIFFERENTIATION FOR DIALOG CONTEXTS

FIELD OF THE INVENTION

The present invention relates to speech synthesis and, more particularly, to generating natural sounding synthetic speech from a source of text.

DESCRIPTION OF THE RELATED ART

Text in different forms, whether electronic mail, magazine or newspaper articles, Web pages, other electronic documents, and the like, can be transformed into audio for various real world applications. Transforming text sources into audio, i.e. speech, allows users to retrieve electronic mail messages over the telephone, listen to audio books, obtain audio programming on digital media for playback at a later time, or obtain any of a variety of other services.

A text source can be transformed into audio in a number of different ways. One way is to record a speaker narrating or speaking the text. This method is commonly used in the case of audio books. Recording a human being yields natural sounding audio. The speaker is able to interject personality and emotion into the recording by varying qualities such as voice inflection, voice pitch, and the like based upon the content and/or context of the text passages being read. For example, the narrator of a story often raises the pitch of his or her voice when reading the part of a female and lowers the pitch of his or her voice when reading the part of a male. Similarly, the narrator typically alters his or her voice to indicate to a listener that a different character is speaking. Recording a live speaker, however, can be very costly. Additionally, it can take a great deal of time to record and mix a performance.

An alternative to recording a live human being is to use a text-to-speech (TTS) system to generate synthetic speech, thereby creating an audio rendition of the text source. Speech synthesis, or TTS, is much less expensive than hiring voice talent and can yield an audio version of a text source relatively quickly. While speech synthesis has improved significantly in recent years, the resulting audio still sounds mechanical and generally less pleasing to the ear than a live human being. Speech synthesis typically produces monotone speech that lacks personality.

It would be beneficial to provide a technique for transforming a text source into speech which overcomes the limitations described above.

SUMMARY OF THE INVENTION

The embodiments disclosed herein provide methods and apparatus for generating natural sounding synthetic speech from a text source. One embodiment of the present invention can include a computer-implemented method of speech synthesis including automatically identifying spoken passages and non-spoken passages within a text source. The method can include determining a speaker identity and a speaker gender for spoken passages within the text source, associating spoken passages with at least a first voice configuration according to speaker identity and speaker gender, wherein each speaker identity is associated with a different voice configuration, and associating non-spoken passages with a second voice configuration. The text source can be converted to speech by selectively applying the at least a first voice configuration or the second voice configuration to different portions of text within the text source according to whether each portion of text was identified as a spoken passage or a non-spoken passage and, for spoken passages, the speaker identity and speaker gender associated with each spoken passage.

Another embodiment of the present invention can include a text-to-speech system including a computer system programmed to perform speech synthesis. The text-to-speech system can automatically identify spoken passages and non-spoken passages within a text source, determine a speaker identity and a speaker gender for spoken passages within the text source, associate spoken passages with at least a first selected voice configuration according to speaker identity and speaker gender, wherein each speaker identity is associated with a different voice configuration, and associate non-spoken passages with a second voice configuration. The text-to-speech system further can convert the text source to speech by selectively applying the at least a first voice configuration or the second voice configuration to different portions of text within the text source according to whether each portion of text was identified as a spoken passage or a non-spoken passage and, for spoken passages, the speaker identity and speaker gender associated with each spoken passage.

Yet another embodiment of the present invention can include a machine readable storage, having stored thereon a computer program having a plurality of code sections for causing a machine to perform the various steps and implement the components and/or structures disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein can generate more natural sounding synthesized speech, also referred to herein as audio, from a text source. In accordance with the inventive arrangements disclosed herein, a text source can be processed to distinguish between spoken passages and non-spoken passages. Further attributes of the text source can be determined relating to gender and/or identity of the speaker of a spoken passage. Thus, when generating a speech synthesized version of the text source, different voice configurations can be selected and applied to different portions of the text source according to the particular attributes associated with the portion of text being rendered. The embodiments described herein can be used in any of a variety of different applications in which speech is to be generated from text, whether producing an audiobook from text, creating a podcast from a textual script, or creating any other sort of recording, whether digital or analog, from a corpus of digitized text.

Figure 1:
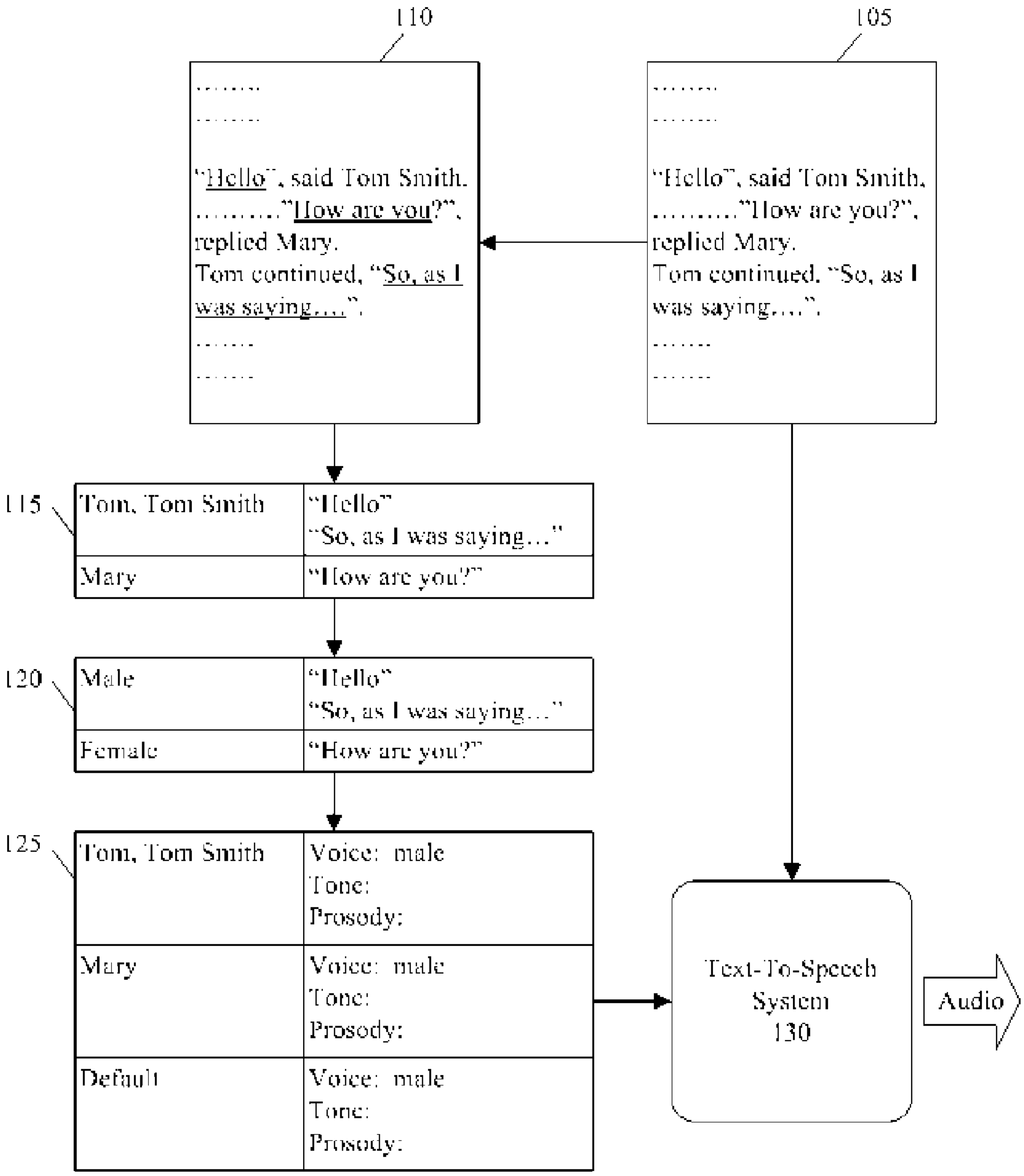
FIG. 1 is a flow diagram illustrating a technique for generating audio from a text source by dynamically applying voice configurations in accordance with one embodiment of the present invention.

FIG. 1 is a flow diagram illustrating a technique for generating audio from a text source by dynamically applying voice configurations in accordance with one embodiment of the present invention. In accordance with the embodiments disclosed herein, a text source 105 includes portions of text that are intended to be spoken and portions of text that are not spoken. The text source can be virtually any machine readable file or storage medium having text stored therein. As used herein, a portion of text that is to be spoken can include, but is not limited to, dialog. Non-spoken portions of text can include those that are not considered dialog, but rather are attributed to a narrator or serve as general description.

The text source 105 can be processed automatically such that portions of text that are considered spoken are distinguished from portions of text that are considered non-spoken. The process of identifying spoken and non-spoken text of the text source 105 can be performed using any of a variety of different techniques. Accordingly, the particular technique used is not intended as a limitation of the present invention, but rather as a basis for teaching one skilled in the art how to implement the embodiments described herein.

In one embodiment, various rules for parsing text can be implemented to discern spoken from non-spoken text. For example, one rule can indicate that text surrounded by quotation marks is to be identified as a spoken passage. Another example of a rule can be that text formatted in a particular font or being associated with some other marker can be identified as a spoken passage.

In another embodiment, a statistical model can be trained to identify other patterns that indicate spoken passages. Different static rules may be applied to determine spoken passages depending upon the outcome, or results, of the statistical model. In illustration, a statistical model may detect that the text source 105 is an interview written in a question and answer format. In that case, a static rule may be applied that distinguishes between portions of text indicating the interviewer or the interviewee and their respective questions and answers. The questions and answers can be labeled as spoken passages of text.

It should be appreciated that while either a static rules technique or a statistical model technique can be used independently of one another, such techniques can be used in combination. In that case, the statistical model can provide an added measure of certainty. In illustration, not every portion of text that is surrounded by quotation marks corresponds to a spoken passage. It may be the case, for example, that the text in quotation marks is a special phrase or a foreign word. Accordingly, a statistical model can be applied to detect false positives originating by application of the static rules. Such a statistical model can be used to determine whether a given portion of text is a spoken passage given a surrounding word context. The model can be trained on text that has portions which have been labeled as spoken passages through the application of static rules. The training outcome for the model is determined by an annotator that labels whether a portion of text labeled as a spoken passage by static rules is, in reality, a spoken passage. In any case, text box 110 indicates the state of the text source after the spoken passages have been automatically identified. For purposes of illustration, each spoken passage has been underlined.

The next phase of processing determines the identity of the speaker of the various spoken passages identified in text box 110. As shown in table 115, a speaker identity has been associated with each spoken passage identified from the text source 105. That is, the identity of the person and/or character that is to speak the portion of text is determined automatically. Thus, the spoken passages that were attributable to the character "Tom" or "Tom Smith" have been associated with that speaker. The spoken passages attributable to the character "Mary" have been associated with that speaker.

In one embodiment of the present invention, static rules can be applied to the text passages to determine the speaker identity. The static rules, for example, can employ techniques such as regular expressions to match particular strings. In this manner, the static rules can identify instances in the text source where proper names are followed by terms such as "said", "replied", "exclaimed", or other indicators of dialog.

Further rules for processing text can be applied such as in cases where ambiguity exists as to the identity of the speaker. For example, in cases where a measure of certainty as to the identity of a speaker does not rise above an established threshold, it can be determined that the spoken passage has the same speaker identity as the previous spoken passage. These are but a few examples of possible rules that can be applied and, as such, are not intended to offer an exhaustive listing of all possible rules.

In another embodiment, as noted, statistical models in combination with a semantic interpreter can be applied to the text source 105 to determine the speaker identity for spoken passages. In such an embodiment, speaker tokens can be identified. For example, the model can be trained in the following way given a sample text phrase: "Hi Mary", Tom said. "How was your day?". Because this model is run after spoken passages have been determined, the training input would be of the following format: SPOKEN_PASSAGE, Tom said. SPOKEN_PASSAGE. The semantic interpreter is run before the statistical model producing the output: SPOKEN_PASSAGE COMMA PROPER_NAME SPEAKING_REF PERIOD SPOKEN_PASSAGE PERIOD. In this case the semantic interpreter labeled Tom as a proper name, the verb "said" as having the semantic meaning of SPEAKING. The semantic interpreter may also normalize for punctuation thus labeling "," as a COMMA and "." as PERIOD.

An annotation step then can be performed where a human user associates spoken passages with tokens in the training phrase thus resulting in the annotation: SPOKEN_PASSAGE (1) COMMA PROPER_NAME(1,2) COMMA SPEAKING_REF PERIOD SPOKEN PASSAGE(2) PERIOD. The annotation demonstrates that PROPER_NAME is associated with the spoken passages (1) and (2) corresponding to "Hi Mary" and "How was your day?" respectively. For example, the training may produce a statistical model including the following rules given the aforementioned text: SPOKEN_PASSAGE(s1) COMMA PROPER_NAME(x) SPEAKING_REF PERIOD SPOKEN_PASSAGE(s2). These rules indicate that the speaker for SPOKEN_PASSAGE(s1) is PROPER_NAME(x), that the speaker for SPOKEN_PASSAGE(s1) is the first PROPER_NAME occurring after (s1), that the speaker for (s2) is the speaker identified for passage (s1), and that the speaker for (s2) is the PROPER_NAME immediately preceding (s2). Depending on the type and configuration of the statistical model, many more such rules may be inferred. These rules comprise the statistical model used to determine the speaker tokens for a given spoken passage in a text source. It should be appreciated that the techniques disclosed herein for processing the text source 105 can be applied either singly or in any combination.

A next phase can include automatically identifying a gender for the spoken passages. Table 120 shows that each spoken passage has been associated with a particular gender. Gender can be determined using one or more, or any combination of the text processing techniques already described. In the case of static rules, for example, particular phrases with gender specific pronouns can be identified such as "he said", "she said", "he declared", and the like. In general, gender is considered easier to determine than identity because pronouns such as "he" or "she" do not have to be resolved to the actual speaker. In one embodiment, if no gender can be determined for a spoken passage with a confidence level above an established threshold, the gender for the prior spoken passage can be associated with the current spoken passage.

With respect to statistical models, again, relationships can be identified to determine tokens that indicate gender. It should be appreciated, that since a speaker may have been identified for the spoken passage, a lookup table also can be used where the speaker identity, i.e. "Tom" is associated with a gender such as "male". Thus, the lookup table can specify a plurality of names and an associated gender for each. Still, as noted, the techniques disclosed herein can be applied singly or in any combination.

After processing of the text source 105 is complete, a reference table 125 can be created automatically. The reference table can specify various speaker identities and the attributes corresponding to each identity. Thus, as shown, the speaker identity "Tom" has been identified as male. These sorts of associations can be made automatically by the text source processing system. Still, however, other parameters can be added manually if so desired such as tone, prosody, or the like.

The reference table 125 can be accessed by the text-to-speech (TTS) system 130 to audibly render the text source 105. As each portion of text is obtained for playback in the TTS system 130, the attributes corresponding to that portion of text can be recalled from the reference table 125 or read from the text, for example in the case where the text has been annotated with the attributes. The attributes can indicate a voice configuration to be used by the TTS system 130 for playing back that particular portion of text. The TTS system 130 can dynamically apply different voice configurations to different portions of text within the text source 105 according to the attributes determined for each respective portion of text. This allows the TTS 130 to use a male voice for spoken passages spoken by a male, a female voice for spoken passages spoken by a female, a distinctive voice for each speaker and/or character that is gender appropriate, as well as a default voice for a narrator or other portions of text that are determined to be non-spoken.

Figure 2:
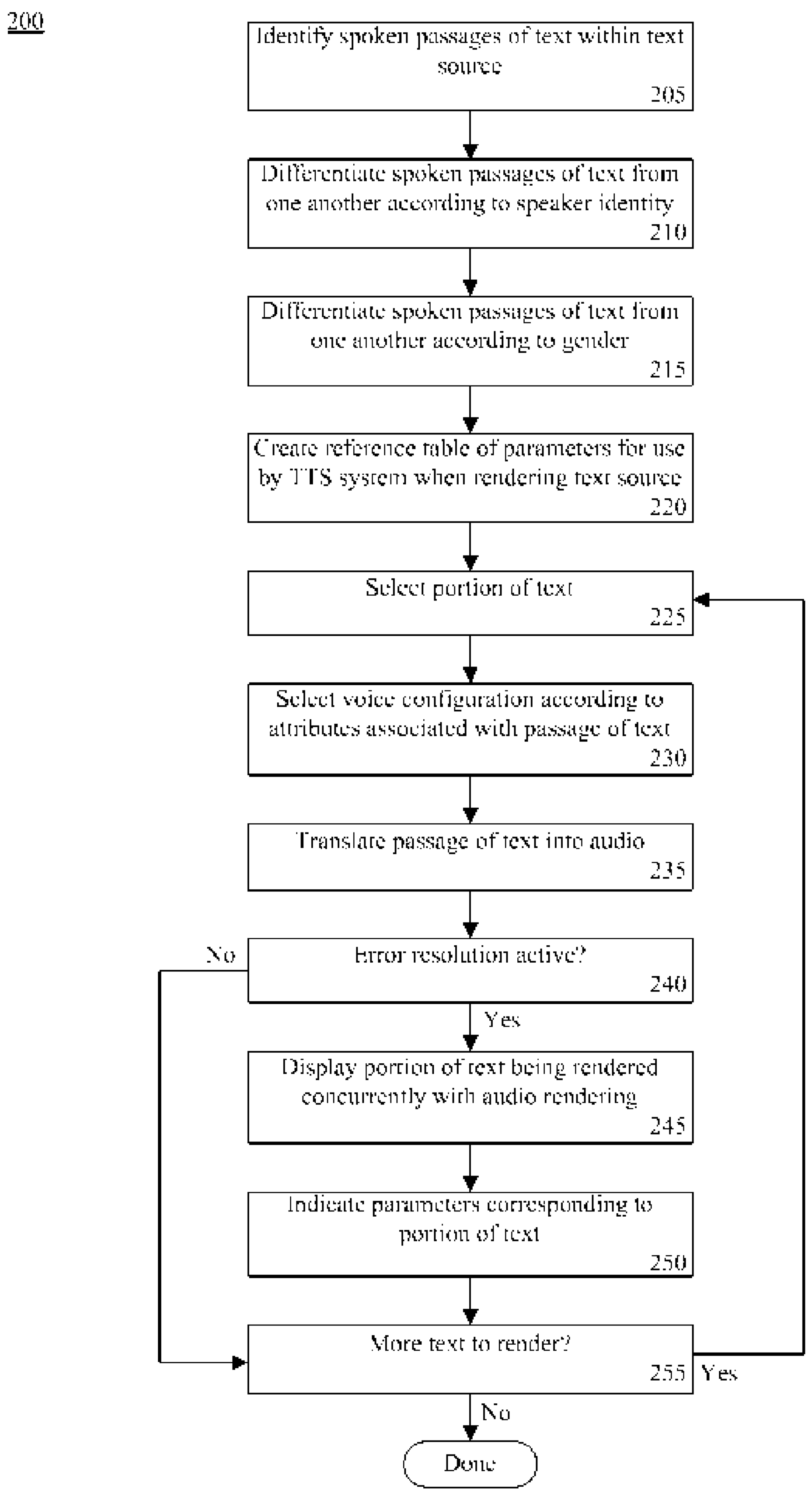
FIG. 2 is a flow chart illustrating a method of generating audio from a text source by dynamically applying voice configurations in accordance with another embodiment of the present invention.

FIG. 2 is a flow chart illustrating a method 200 of generating audio from a text source by dynamically applying voice configurations according to another embodiment of the present invention. Method 200 illustrates several different aspects of the present invention relating to automatically processing a text source to classify portions of text according to spoken, non-spoken, gender, and speaker identity. Further, method 200 illustrates a technique for error resolution which can be performed interactively and/or concurrently with speech synthesis of the text source. In any case, method 200 can begin in a state where a text source, whether a word processing document, a Web page, or the like, has been loaded into a text processing system as described with reference to FIG. 1.

Accordingly, method 200 can begin in step 205 where spoken passages of text within the text source can be identified. In step 210, the spoken passages of text can be differentiated from one another on the basis of speaker identity. That is, the person and/or character, as the case may be, determined to be the speaker of each portion of text can be identified and associated with the portion of text that person or character is to speak. In step 215, the spoken passages of text further can be differentiated from one another on the basis of gender.

In step 220, a reference table can be created that includes the parameters determined in steps 205-215. The reference table can store the attributes along with a reference to the portion of text to which each parameter corresponds. As noted, a user or developer can modify the reference table as may be required by overriding or modifying automatically determined attributes, adding additional attributes, and/or deleting attributes from the reference table.

Beginning in step 225, the method can begin the process of converting the text source to speech or audio. While step 225 immediately follows step 220, it should be appreciated that the processes of converting the text source to speech can be performed immediately after the text source has been processed, or after some period of time. In any case, in step 225, a portion of text from the source of text can be selected.

In step 230, a voice configuration in the TTS system can be selected according to the parameters listed in the reference table for the selected portion of text. Thus, for example, if the attributes in the reference table for the portion of text indicate that the portion of text is a spoken passage, that a male voice is to be used to render the text, as well other attributes that are specific to an identified character, a corresponding voice configuration can be selected. If the portion of text was non-spoken, then a default or other specified voice configuration can be selected.

A voice configuration refers to a collection of one or more attributes including, but not limited to, a "voice" attribute corresponding to a speaker configuration in the speech synthesis engine being used. Typically this parameter corresponds to a particular voice talent that was used to build a speech synthesis profile. Other attributes that may be used in determining a voice configuration are gender, tone, prosody, and pitch. The set of attributes available is determined by the speech synthesis program, or text-to-speech system, being used. Therefore, the attributes listed, may not correspond to all of the possible parameters or only a subset of the listed attributes may be available for selection by the user. In any case, an attribute can be any parameter within a speech synthesis engine that can distinguish one speech synthesis from another.

In step 235, the portion of text can be translated into synthetic speech. The text is translated into synthetic speech by the TTS system by using the selected voice configuration for the audio rendering process. In step 240, a determination can be made as to whether an error resolution mode has been activated by the user or developer. The error resolution mode allows a developer to view the actual text that is being audibly rendered concurrently with the text being rendered. In this sense, the text displayed to the user essentially "follows along" with the audio rendering of the text. In any case, if the error resolution mode has been activated, the method can proceed to step 245. If not, the method can continue to step 255.

Continuing with step 245, in the case where the error resolution mode has been activated, the text that is being audibly rendered from step 235 also can be displayed upon a display screen. The display of text can be performed substantially simultaneously as that text is being audibly rendered. If more text is displayed upon a display screen than is being rendered, the rendered text can be visibly distinguished from the other displayed text. In any case, text can be displayed and/or visually distinguished from other text on a word by word or a phrase by phrase basis. In step 250, any attributes corresponding to the portion of text also can be displayed. The attributes can be displayed concurrently with the audio rendering. The attributes can be displayed in a manner that indicates the word, or words, with which each attribute is associated, whether through color coding, by placing the attribute proximate, i.e. above or below, the word to which it corresponds, placing tags or other markers in-line with the text, or the like.

It should be appreciated that the determination of which parameters are to be displayed can be a user selectable option. For example, if the developer wishes to work only with gender, then other attributes can be prevented from being displayed such that only gender indicators are presented. The same can be said for speaker identity and/or spoken vs. non-spoken passages. Further, any combination of these attributes can be selectively displayed concurrently with the text being displayed and the audio rendition of the text being played. If the reference table has been supplemented with other attributes for the text, then such attributes can be selectively displayed according to one or more user selectable options also.

In another embodiment, tokens within the text that were identified during various processing stages and which were responsible for classifying a portion of text in a particular manner, i.e. spoken, non-spoken, male gender, female gender, or a particular speaker identity, can be highlighted within the text as it is displayed and/or audibly rendered. This allows the developer to observe whether tokens are leading to a correct interpretation of the text being processed.

In step 255, a determination can be made as to whether there is more text to be audibly rendered within the text source. If so, the method can loop back to step 225 to continue processing further portions of text from the text source. If not, the method can end.

In another embodiment of the present invention, in the error resolution mode, passages of text that were classified, but have a low confidence level, also can be highlighted or otherwise visually indicated. That is, when classifying a portion of text as spoken or non-spoken, according to gender, or speaker identity, a measure of confidence can be computed, for example based upon which rules were invoked for processing the text or based upon the statistical model used. In any case those portions of text having a confidence score that does not exceed a threshold value, which can be user-specified, can be visually indicated during the error correction mode to alert a developer that the portion of text may have been misclassified.

It should be appreciated that the particular manner in which text is visualized or distinguished or in which attributes of text are displayed is not intended as a limitation of the present invention. Rather, any of a variety of visualization methods and/or techniques can be used.

The present invention facilitates the generation of more natural sounding speech using a TTS or other speech synthesis system. As noted, text can be automatically processed and marked or tagged for attributes such as whether the text is spoken or non-spoken and the identity and/or gender of the person or character that is to speak passages labeled as spoken. This information can be used by a TTS system when producing an audible rendition of the text to dynamically select an appropriate voice configuration on a word-by-word, phrase-by-phrase, etc. basis according to the attributes determined for the particular portion of text being rendered at any given time.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of speech synthesis to create an audio recording from a text source comprising a story including a first character and a second character, the method comprising:

automatically identifying based, at least in part, on a content of the text source, at least one first spoken passage as being spoken by the first character, at least one second passage as being spoken by the second character, and at least one non-spoken passage within the text source from which speech is to be synthesized to create the audio recording;

automatically assigning a first voice configuration for the first character to the at least one first spoken passage, a second voice configuration for the second character to the at least one second spoken passage, and a third voice configuration to the at least one non-spoken passage;

automatically identifying at least one third spoken passage having a measure of certainty regarding an identity of the character speaking the at least one third spoken passage being less than a threshold value;

automatically assigning to the at least one third spoken passage, a voice configuration for a character assigned to a spoken passage preceding the at least one third spoken passage; and creating the audio recording by converting the text source to speech by selectively applying the first voice configuration to the at least one first spoken passage, applying the second voice configuration to the at least one second spoken passage, and applying the third voice configuration to the at least one non-spoken passage.

2. The method of claim 1, further comprising:

automatically determining a speaker gender for at least one fourth spoken passage based, at least in part, on gender specific pronouns identified in the text source.

3. The method of claim 1, further comprising:

automatically determining a speaker gender for at least one fourth spoken passage based, at least in part, on gender specific proper names identified in the text source.

4. The method of claim 1, wherein the audio recording is an audiobook of the story.

5. The method of claim 1, wherein the audio recording is a podcast.

6. The method of claim 1, wherein the at least one first spoken passage includes a plurality of first spoken passages identified as being spoken by the first character, wherein the method further comprises:

determining a confidence value for at least one of the plurality of first spoken passages that the at least one of the plurality of first spoken passages is associated with the first character in the story; and visually indicating the confidence value on a display.

7. A text-to-speech system comprising:

at least one computer programmed to perform speech synthesis for creating an audio recording from a text source comprising a story including a first character and a second character, wherein the at least one computer is programmed to:

automatically identify based, at least in part, on a content of the text source, at least one first spoken passage as being spoken by the first character, at least one second passage as being spoken by the second character, and at least one non-spoken passage within the text source from which speech is to be synthesized to create the audio recording;

automatically assign a first voice configuration for the first character to the at least one first spoken passage, a second voice configuration for the second character to the at least one second spoken passage, and a third voice configuration to the at least one non-spoken passage;

automatically identify at least one third spoken passage having a measure of certainty regarding an identity of the character speaking the at least one third spoken passage being less than a threshold value;

automatically assign to the at least one third spoken passage, a voice configuration for a character assigned to a spoken passage preceding the at least one third spoken passage; and create the audio recording by converting the text source to speech by selectively applying the first voice configuration to the at least one first spoken passage, applying the second voice configuration to the at least one second spoken passage, and applying the third voice configuration to the at least one non-spoken passage.

8. The text-to-speech system of claim 7, wherein the at least one computer is programmed to automatically determine a speaker gender for at least one fourth spoken passage based, at least in part on gender specific pronouns identified in the text source.

9. The text-to-speech system of claim 7, wherein the at least one computer is programmed to automatically determine a speaker gender for at least one fourth spoken passage based, at least in part on, gender specific proper names identified in the text source.

10. The text-to-speech system of claim 7, wherein the audio recording is an audiobook of the story.

11. The text-to-speech system of claim 7, wherein the audio recording is a podcast.

12. The text-to-speech system of claim 7, wherein the at least one computer is further programmed to:

determine a confidence value for at least one of the plurality of first spoken passages that the at least one of the plurality of first spoken passages is associated with the first character in the story; and visually indicate the confidence value on a display.

13. A machine readable storage having stored thereon a computer program having a plurality of code sections comprising:

code for automatically identifying based, at least in part, on a content of the text source, at least one first spoken passage as being spoken by a first character of a story, at least one second passage as being spoken by a second character of the story, and at least one non-spoken passage within the text source from which speech is to be synthesized to create the audio recording;

code for automatically assigning a first voice configuration for the first character to the at least one first spoken passage, a second voice configuration for the second character to the at least one second spoken passage, and a third voice configuration to the at least one non-spoken passage;

code for automatically identifying at least one third spoken passage having a measure of certainty regarding an identity of the character speaking the at least one third spoken passage being less than a threshold value;

code for automatically assigning to the at least one third spoken passage, a voice configuration for a character assigned to a spoken passage preceding the at least one third spoken passage; and code for creating the audio recording by converting the text source to speech by selectively applying the first voice configuration to the at least one first spoken passage, applying the second voice configuration to the at least one second spoken passage, and applying the third voice configuration to the at least one non-spoken passage.

14. The machine readable storage of claim 13, further comprising code for automatically determining a speaker gender for at least one fourth spoken passage based, at least in part, on gender specific pronouns identified in the text source.

15. The machine readable storage of claim 13, wherein the code for automatically determining a speaker gender for at least one fourth spoken passage based, at least in part, on gender specific proper names identified in the text source.

16. The machine readable storage of claim 13, wherein the audio recording is an audiobook of the story.

17. The machine readable storage of claim 13, wherein the audio recording is a podcast.

18. The machine readable storage of claim 13, further comprising:

code for determining a confidence value for at least one of the plurality of first spoken passages that the at least one of the plurality of first spoken passages is associated with the first character in the story; and code for visually indicating the confidence value on a display.

* * * * *